(12) United States Patent
Neuburger et al.

(10) Patent No.: US 8,528,417 B2
(45) Date of Patent: Sep. 10, 2013

(54) ELECTROMAGNETIC FLOWMETER HAVING A MEASURING TUBE WITH AN ELECTRICALLY-INSULATING INTERNAL COATING POSITIONED IN A RECESS

(75) Inventors: Stefan Neuburger, Stadecken-Elsheim (DE); Josef Neven, Mours St. Eusèbe (FR)

(73) Assignee: Krohne AG, Basel (CH)

( * ) Notice: Subject to any disclaimer, the term of this patent is extended or adjusted under 35 U.S.C. 154(b) by 422 days.

(21) Appl. No.: 13/008,507

(22) Filed: Jan. 18, 2011

(65) Prior Publication Data

US 2012/0017698 A1    Jan. 26, 2012

(30) Foreign Application Priority Data

Jul. 26, 2010 (DE) .......................... 10 2010 032 270

(51) Int. Cl.
*G01F 1/58* (2006.01)
(52) U.S. Cl.
USPC ...................................... 73/861.12
(58) Field of Classification Search
None
See application file for complete search history.

(56) References Cited

U.S. PATENT DOCUMENTS

| | | | |
|---|---|---|---|
| 5,062,305 A | 11/1991 | Hansen et al. | |
| 5,670,723 A | 9/1997 | Hansen et al. | |
| 5,750,902 A * | 5/1998 | Schwiderski | 73/861.12 |
| 7,261,001 B2 | 8/2007 | Heijnsdijk et al. | |
| 7,272,978 B2 | 9/2007 | Keese et al. | |
| 8,074,525 B2 | 12/2011 | van Willigen | |

FOREIGN PATENT DOCUMENTS

| | | |
|---|---|---|
| DE | 1 177 835 B | 9/1964 |
| DE | 197 08 857 A1 | 7/1998 |
| WO | 01/90702 A2 | 11/2001 |

* cited by examiner

*Primary Examiner* — Harshad R Patel
(74) *Attorney, Agent, or Firm* — Roberts Mlotkowski Safran & Cole, P.C.; David S. Safran (57) ABSTRACT

An electromagnetic flowmeter having a measuring tube, at least one magnetic device and at least two electrodes. The measuring tube having an inlet section with an inlet section terminal cross section, an outlet section with an outlet section terminal cross section, a recess formed between the inlet section and the outlet section with a recess cross section that is wider than the inlet section terminal cross section and the outlet section terminal cross section, and an internal coating positioned in the recess. The layer thickness of the internal coating is chosen to be appropriately thick in order to guarantee electrical insulation and to arrange the internal coating in the recess such that it is protected from damage by flowing measurement fluid.

20 Claims, 6 Drawing Sheets

Fig. 6

ELECTROMAGNETIC FLOWMETER HAVING A MEASURING TUBE WITH AN ELECTRICALLY-INSULATING INTERNAL COATING POSITIONED IN A RECESS

BACKGROUND OF THE INVENTION

1. Field of the Invention

The invention relates to an electromagnetic flowmeter having a measuring tube, and more particularly, to an electromagnetic flowmeter having a measuring tube with an electrically-insulating internal coating positioned in a recess of the measuring tube.

2. Description of Related Art

The measurement principle of electromagnetic flowmeters in based on the separation of moving charges in a magnetic field. Electromagnetic flowmeters are generally formed of a measuring tube of a non-magnetic substance e.g., of a non-magnetic metal that is electrically insulated by an insulating coating from a measurement fluid on a flow-side and is permeated by a magnetic field perpendicular to a direction of flow created by a magnetic device e.g., coils. If the measurement fluid flowing through the measuring tube has a minimum conductivity, charge carriers, e.g., ions or charged particles, present in the conductive measurement fluid are deflected by the magnetic field. A voltage is created by the charge separation on measurement electrodes arranged perpendicular to the magnetic field and to the direction of flow, which is detected by a measuring device and evaluated as a measurement voltage. The value of the measurement voltage is proportional to the flow speed of the charge carriers moving within the measurement fluid.

The electrically insulating coating consists of different electrically insulating materials in the related art. For example, the electrically insulating coating comprises plastics or ceramics and is applied by means of conventional coating methods.

For example, European Patent Application EP 1285235B1 and corresponding International Patent Application Publication WO 01/90702 A2, disclose an electromagnetic flowmeter in which the electrically insulating coating is applied either on an entire inner surface of the measuring tube or, alternatively, only partially as a circular ring on the measuring tube in the area of the electrodes. However, the electrically insulating coating known from the related art has the disadvantage that the electrically insulating coating can be damaged and possibly dissolved by the flowing medium. In particular, the electrically insulating coating can be damaged and possibly dissolved at transition edges between the measuring tube and the electrically insulating coating.

SUMMARY OF THE INVENTION

Based on the problems know from the related art, it is a primary object of the present invention to provide an electromagnetic flowmeter that is less susceptible to damage of the electrically insulating coating by the measurement fluid. More specifically, it is a primary object of the present invention to provide an electromagnetic flowmeter that is less susceptible to damage of the electrically insulating coating when particles are carried along with the measurement fluids.

The above primary object is met with an electromagnetic flowmeter comprising an inlet section and an outlet section, wherein the inlet section and the outlet section of the measuring tube have a terminal cross section. The measuring tube is widened in comparison to the terminal cross section between the inlet section and the outlet section such that a recess is formed. Electrodes are arranged in the recess and an electrically insulating coating is applied to the measuring tube in the recess.

In an aspect of the invention, the inlet section and the outlet section have a terminal cross section in their axial length parallel to a direction of flow of the measurement fluid, which is preferably constant over each length of the inlet section and the outlet section. For simple orientation, an upstream section is called the "inlet section" and a section of the measuring tube located downstream is called the "outlet section." The cross section of the inlet section corresponds to the cross section of the outlet section. When speaking of a cross section, for example the terminal cross section, what is meant is the cross section or area of a cut through the measuring tube perpendicular to the direction of flow of the measurement fluid.

The recess extends between the inlet section and the outlet section, which is formed by a preferably constant widening of the cross section of the measuring tube e.g., starting with the size of the terminal cross section. A constant widening of the cross section means that the cross section has been widened to the same degree and a depth of the recess corresponding to the widening is constant in all directions. The depth of the recess, e.g., the degree of the widening of the terminal cross section is constant over the entire length of the recess (e.g., parallel to the direction of flow of the measurement fluid). A short transitional area may be provided for the recess from the terminal cross section of the inlet section or the outlet section in which the depth of the recess continuously or step-like increases or decreases.

The internal coating is applied to the measuring tube in the area of the recess. In particular, the application of the internal coating is provided on the entire length of the recess e.g., parallel to the direction of flow of the measurement fluid. Preferably, the internal coating is applied solely in the area of the recess so that the other areas of the measuring tube are not coated. The layer thickness of the internal coating is dimensioned in such a manner that a sufficient electrical insulation of the measuring tube from the measurement fluid in the area of the internal coating is implemented. The electrodes for detecting the measurement voltage are arranged in the area of the recess and thus, also in the area of the internal coating in such a manner that they are perpendicular to the magnetic field created by the magnetic device. Preferably, the electrodes are led through the measuring tube wall perpendicular to the direction of flow and contacted outside of the measuring tube.

Insulation of the electrodes from the measuring tube wall and prevention of measurement fluid leaking through the recess provided in the measuring tube wall occurs advantageously because the electrodes are affixed in separate feed-throughs in the measuring tube wall. The feed-throughs preferably comprise glass or ceramic, and are mounted by (1) leading them out of the measuring tube internal capacity, (2) affixing them to the measuring tube from the outside, or (3) introducing them to the measuring tube internal capacity. The electrodes are preferably affixed in the feed-throughs in such a manner that they end flush with the feed-throughs.

The electromagnetic flowmeter according to the present invention is provided for mounting between two pipes of a piping system. The measuring tube is located in the mounted state in a housing, not described in detail here, or the housing is affixed to the measuring tube so that the evaluation electronics and the additional necessary components of a electromagnetic flowmeter are located in the housing.

The invention is advantageous in that the internal coating is applied to the measuring tube in the area of the recess so that the internal coating is arranged protected from damage by the flowing measurement fluid. In particular, the internal coating is protected from damage by particles in the fluid. In electromagnetic flowmeters known from related art, the transitional areas from the surface of the measuring tube to the internal coating have been shown to be particularly susceptible to damage, since these transitional areas or edges provide a surface for damaging influences. In contrast, the design according to the teaching of the present invention provides the internal coating affixed in the recess so that the risk of damage or dissolving of the internal coating is reduced. Specifically, the recessed internal coating does not have small susceptible surfaces since the basis of the internal coating is always located behind a ledge created by the recess.

In the mounted state, the piping system is attached with the terminal cross section. For example, the piping system is attached directly to the inlet section or the outlet section, whose cross section then corresponds to the terminal cross section. A connection is advantageously implemented via a flange or by directly welding the measuring tube in the piping. Alternatively, for example, an intermediate adapter piece is provided on both sides, which fits the terminal cross section of the measuring tube to the actual cross section of the piping system, wherein a terminal unit, e.g., a flange is provided or a direct welding occurs.

According to another aspect of the invention, the recess is partially filled with the internal coating in respect to the recess' depth. The layer thickness of the internal coating is consequently less than the depth of the recess in respect to the terminal cross section. Thus, there is no susceptible surface with respect to the internal coating for which the flowing medium can strike because the side areas of the internal coating are completely hidden behind the ledge formed by the recess. The layer thickness of the internal coating is chosen to be appropriately thick in order to guarantee electrical insulation. In particular, the necessary minimum layer thickness is influenced, inter alia, by the measurement voltage and the material of the internal coating.

According to another aspect of the invention, the recess is completely filled with the internal coating in respect to recess' depth. In particular, the thickness of the layer of the internal coating is greater than the depth of the recess. The recess in this design is filled with the internal coating at least completely from the bottom of the recess to the level of the terminal cross section. In particular, the layer thickness of the internal coating is greater than the depth of the recess such that the internal coating extends beyond the recess and the resulting measuring tube cross section is slightly smaller than the terminal cross section present on both sides of the recess. This design has the advantage that a greater thickness or an increase in a number of layers of the internal coating can be implemented, while the production effort for the recess is kept small due to the low depth of the recess. At the same time, however, an advantageous attachment of the internal coating is made possible due to the recessed attaching position of the internal coating within the recess. The basis, e.g., the bottom area of the internal coating, lies below the level of the terminal cross section so that the internal coating cannot be struck from below by the flowing medium and the probability of it dissolving is clearly reduced. This design is particularly suitable, for example, when the internal coating is formed of a double layer of two materials and the abutting surfaces between both layers is protected by the ledge formed by the recess.

According to another aspect of the invention, advantageously, when the internal coating extends slightly at an edge onto the inlet section and/or the outlet section a slight increase in adhesion occurs between the measuring tube and the internal coating around an edge in the measuring tube. Basically, the inlet section and the outlet section are not coated. The internal coating is only slightly extended onto the inlet section or the outlet section in this design. "Slightly" means an extension of the internal coating onto the inlet section or the outlet section by an amount that corresponds to about one to five times the layer thickness. By way of non-limiting example, at a layer thickness of 500 µm, the internal coating is consequently extended in the inlet section as well as the outlet section about 1.5 mm onto the inlet and outlet sections. An internal coating is implemented in this design that adheres reliably to the surface of the measuring tube.

According to another aspect of the invention, it is provided that the layer thickness of the internal coating corresponds to the depth of the recess so that the resulting cross section in the area of the recess corresponds to the terminal cross section and the resulting measuring tube is formed having a nearly constant measuring tube cross section. This design has the advantage that the internal coating is protected against damages and the flow is not influenced by the internal coating because the recess is completely filled with the internal coating. Thus, no ledge is created between the terminal cross section and the resulting measuring tube cross section in the area of the internal coating such that the flow profile of the measurement fluid is not influenced by the internal coating. Consequently, the internal coating is completely recessed in the recess such that a smooth and uniform flow channel with a uniform measuring tube cross section is created over the entire length of the measuring tube.

Depending on the production method with which the measuring tube is produced, but also depending on the material of the measuring tube and the internal coating, different transitional areas are designed between the terminal cross section and the recess. According to another aspect of the invention, transitional areas are provided from the terminal cross section to the recess. In particular, transitional areas are implemented by a slanted surface with a straight or curved profile, or alternatively, have a step-shaped contour. The terminal cross section is continuously widened at the recess cross section or continuously tapered from the recess cross section to the terminal cross section through these transitional areas. The continual transition can, for example, be implemented as an even slanted surface, e.g., with a slant having an arbitrary angle. Curve-shaped courses of the transition have also been shown to be advantageous. As an alternative to a continuous course, a step-shaped contour is provided, wherein the terminal cross section is extended with a plurality of steps or with one single step to the recess cross section or is tapered to the recess cross section. However, the step-shaped transitional areas require a higher production effort in comparison to the continuous transitional areas.

Depending on the size of the measuring device and the terminal cross section, the depth of the recess is dimensioned differently. It has been shown to be of particular advantage when the recess has a depth of about 0.1 µm to 1,000 µm, preferably a depth of 100 µm to 300 µm. Depending on the applied layer thickness of the internal coating, one of the above combinations of the internal coating and the recess is created, in which the recess, for example, extends beyond the internal coating or the internal coating ends flush with the terminal cross section. Thus, it is particularly preferred that the internal coating has a thickness of about 0.1 µm to 1,000 µm, and more particularly 100 µm to 300 µm. When an internal coating that is produced with a double layer of two different overlapping materials it is preferred that the lower layer, which is contact with the surface of the measuring tube, has a layer thickness of about 10 µm to 20 µm and the second layer has a thickness of about 200 µm to 300 µm.

Different materials are provided for the internal coating, which guarantee an electrical insulation and are sufficiently abrasion-resistant. Plastic, glass or ceramic, for example, are all possibilities. According to another aspect of the invention, the internal coating comprises a ceramic. In particular, the internal coating comprises titanium oxide or aluminum silicates. When the internal coating comprises a double layer consisting of a carrier layer and a top layer, the carrier layer consists preferably of ceramic and the top layer consists preferably of plastic having a particularly high electrical insulation resistance. Therefore, the carrier layer provides a connection between the top layer and a material surface of the measuring tube. By way of non-limiting example, the internal coating is applied using sputtering, spraying or dipping.

According to another aspect of the invention, the inner contour of the measuring tube is shaped as a polygon in order to increase the quality of the measurement results. In particular, the inner contour of the measuring tube is shaped as a rectangle, more preferably, as a rectangle having rounded corners. Because of the straight sides of the inner contour of the measuring tube as a polygon, measurement of fluid flowing within the measuring tube can be advantageously, uniformly permeated with a magnetic field applied from outside and the measurement voltage in the side areas can be gripped exactly orthogonal to the magnetic field. In the instance that the piping system has a cross section that does not correspond to the measuring tube cross section e.g., a rectangular cross section, an adaptation from the measuring tube cross section or terminal cross section to the cross section of the piping system occurs on the inlet section or the outlet section.

In completely coated measuring tubes, reference electrodes are often provided that are used to determine the potential difference between the potential of the piping system and the potential of the measuring tube. According to another aspect of the invention, the measuring tube is contacted as a reference electrode in the non-coated inlet section and/or in the non-coated outlet section. The non-coated and electrically conductive surfaces in the inlet section and in the outlet section are contacted with the evaluation electronics of the electromagnetic flowmeter in such a manner that a measurement of the potential of the measurement fluid or the wall of the measuring tube can occur. The evaluation result is used to determine and/or correct the measurement of the electrodes. The inlet section and the outlet section are basically non-coated. However, solely based on a previously described aspect of the electromagnetic flowmeter the inlet and the outlet section are slightly coated, e.g. in a range of about 0.5 to 2 mm, with the internal coating.

The electrodes for measuring the measurement voltage evoked by the magnetic field and the flowing measurement fluid are preferably led perpendicularly through the wall of the measuring tube and have to be insulated from the measuring tube. According to another aspect of the invention, the electrodes are arranged in a feed-through of glass or ceramic in the measuring tube wall. Preferably, the electrodes are positioned in an opening in the measuring tube wall, and the hollow space created between the electrode and the measuring tube wall is lined with liquid glass or liquid ceramic so that the electrode is held by the feed-through and is simultaneously electrically insulated with respect to the measuring tube. Alternatively, the feed-through is a prefabricated component that is applied together with the electrode in the measuring tube wall.

The present invention is described in the detailed description which follows, with reference to the accompany drawings which show, by way of non-limiting examples, exemplary embodiments of the present invention.

DETAILED DESCRIPTION OF THE INVENTION

Figure 1:
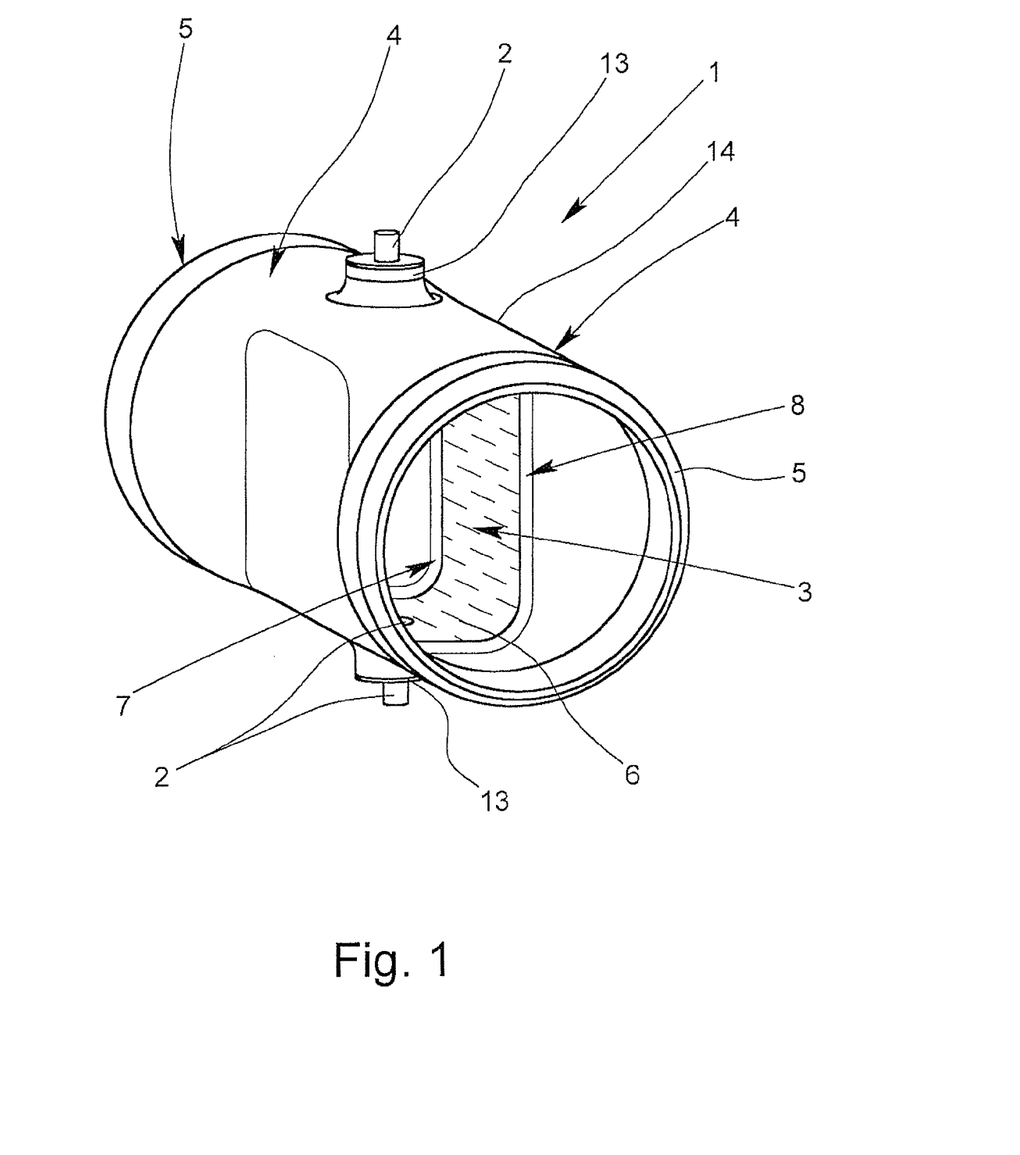
FIG. 1 shows an embodiment of a measuring tube for an electromagnetic flowmeter having a rectangular measuring tube cross section according to the invention.

FIG. 1 shows an embodiment of a measuring tube 1 for an electromagnetic flowmeter. An electrode 2 is arranged on each opposing side of the measuring tube 1, wherein the electrodes 2 are arranged perpendicular to the direction of flow of the measurement fluid and perpendicular to a magnetic field created by a magnetic device (not shown). The measuring tube cross section 3 e.g., the inner contour of the measuring tube 1, is essentially rectangular in design, wherein the corners are rounded. For connection of the measuring tube 1 to a piping system (not shown), adapter pieces 4 are provided on both sides of the measuring tube cross section 3 that fit the cross section of the measuring tube cross section 3 on the piping system cross section (e.g., by way of the non-limiting example provided in FIG. 1 the piping system cross section is depicted as circular). The adapter pieces 4 each have a bevel 5 on their outer edges, which act as a joint preparation, so that the measuring tube 1 can be welded directly onto the pipes of the piping system, which is also provided with a bevel (not shown). In the mounted state, the measuring tube 1 is turned about 90° compared to the alignment shown in FIG. 1, so that the electrodes 2 lie opposing one another on a horizontal plane.

An insulating internal coating 6 is applied to the inside of the measuring tube 1. The measuring tube 1 has an inlet section 7 upstream to the internal coating 6 in the direction of flow and an outlet section 8 downstream to the internal coating 6 in the direction of flow. The inlet section 7 and the outlet section 8 have a common terminal cross section 9, shown in FIG. 2. The measuring tube 1 is widened between the inlet section 7 and the outlet section 8 in such a manner that a recess 10 is formed. Thus, an area with an expanded cross section compared to the terminal cross section 9 is formed. The recess 10, according to FIG. 1, is completely filled with material of the internal coating 6 such that a layer thickness of the internal coating 6 corresponds to a depth of the recess 10 and the resulting measuring tube cross section 3 corresponds to the terminal cross section 9 in the area of the recess 10. Therefore, a ledge is not created between the inlet section 7 and the internal coating 6 and the outlet section 8 and the internal coating 6, so that a flowing measurement fluid can flow through the internal coating 6 without being influenced.

Figure 2:
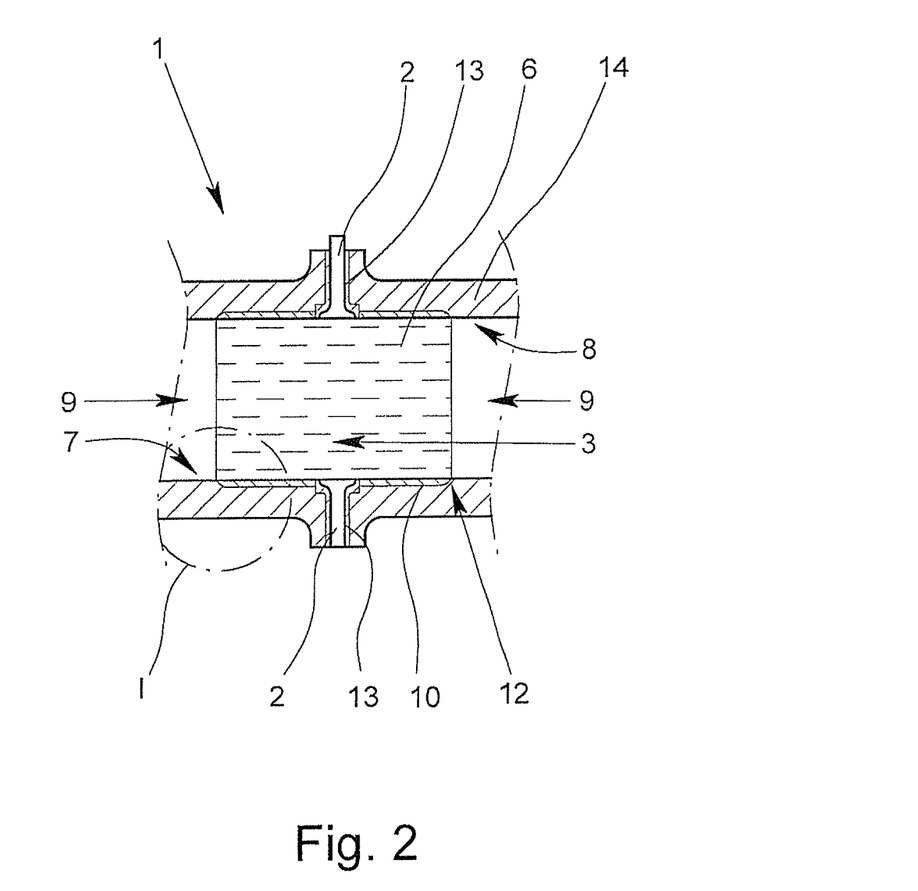
FIG. 2 shows a section of an embodiment of a measuring tube for an electromagnetic flowmeter in a cut side view according to the invention.
Figure 5:
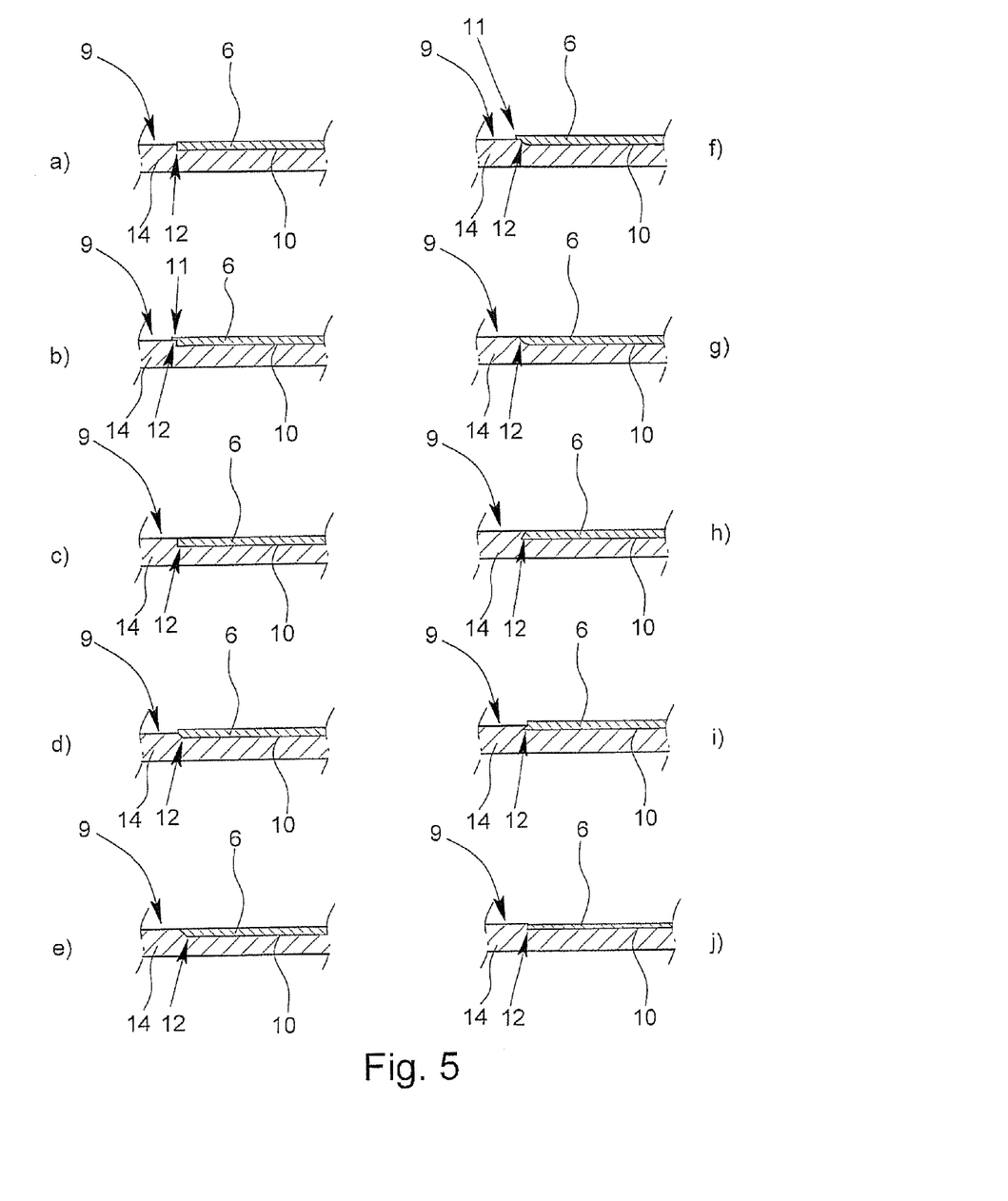
FIG. 5 shows an embodiment with different layer thicknesses of the internal coating and different transitions between the terminal cross section and the recess according to the invention.

FIG. 2 shows an embodiment of a section of a measuring tube 1 for an electromagnetic flowmeter in a cut side view. The internal coating 6 is arranged in the recess 10 and the layer thickness of the internal coating 6 corresponds to the depth of the recess 10, so that a uniform transition to the terminal cross section 9 is implemented. As an alternative to a uniform transition between the internal coating 6 and the inlet section 7 or outlet section 8, the internal coating 6 can be slightly extended according to FIGS. 5b and f around the edge 11, e.g., a few millimeters at the most, onto a surface of the inlet section 7 and/or the outlet section 8. The surfaces of the inlet section 7 and the outlet section 8 are basically non-coated, and thus have direct contact with the measurement fluid. According to FIG. 2, a transitional area 12 present on both sides of the recess 10 between the recess 10 and the terminal cross section 9 is provided with a curve-shaped contour.

Figure 3:
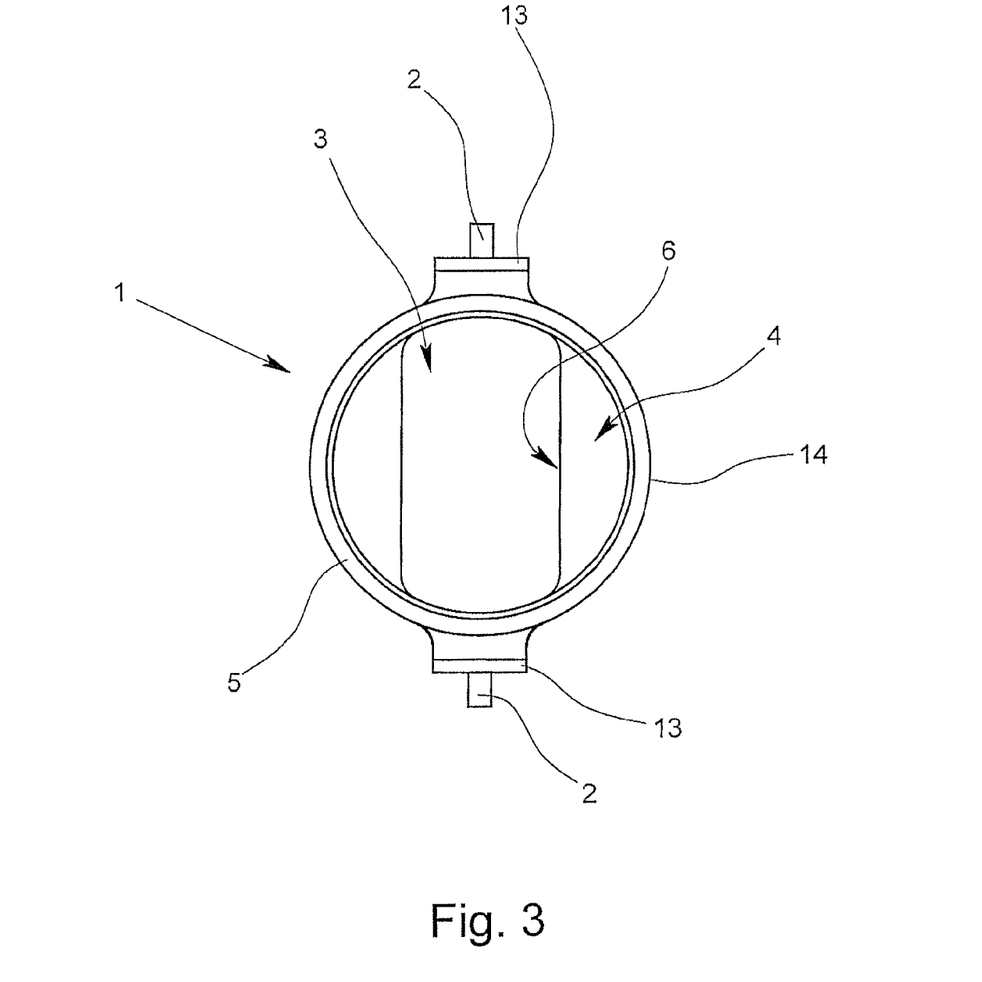
FIG. 3 shows an embodiment of a measuring tube for an electromagnetic flowmeter in side view in the direction of the flow channel according to the invention.

FIG. 3 shows the measuring tube 1, according to FIG. 1, in a side view in the direction of the flow channel. For example in this embodiment, the measuring tube cross section 3 is essentially rectangular and has rounded corners. The bevel 5 acts as a joint preparation for affixing the measuring tube 1 to a piping system (not shown). The electrodes 2 are led perpendicularly through the measuring tube wall 14 with a feed-through 13, so that the electrodes 2 are arranged perpendicular to a magnetic field created by a magnetic device (not shown). By way of non-limiting example, the feed-through 13 comprises glass and insulates the electrodes 2 from the measuring tube wall 14.

According to the embodiment of FIG. 1, the surfaces of the feed-through 13 are in contact with the flow channel and are coated with the internal coating 6 up to the electrodes 2. However, in the embodiment according to FIG. 2 the surfaces of the feed-through 13 are not coated and the internal coating 6 is only applied up to the feed-through 13 and the electrodes 2 in the flow channel are surrounded by a thin circular ring formed by the feed-through 13. Of course, each of the designs for a feed-through 13 is possible for each measuring tube 1 described herein.

Figure 4:
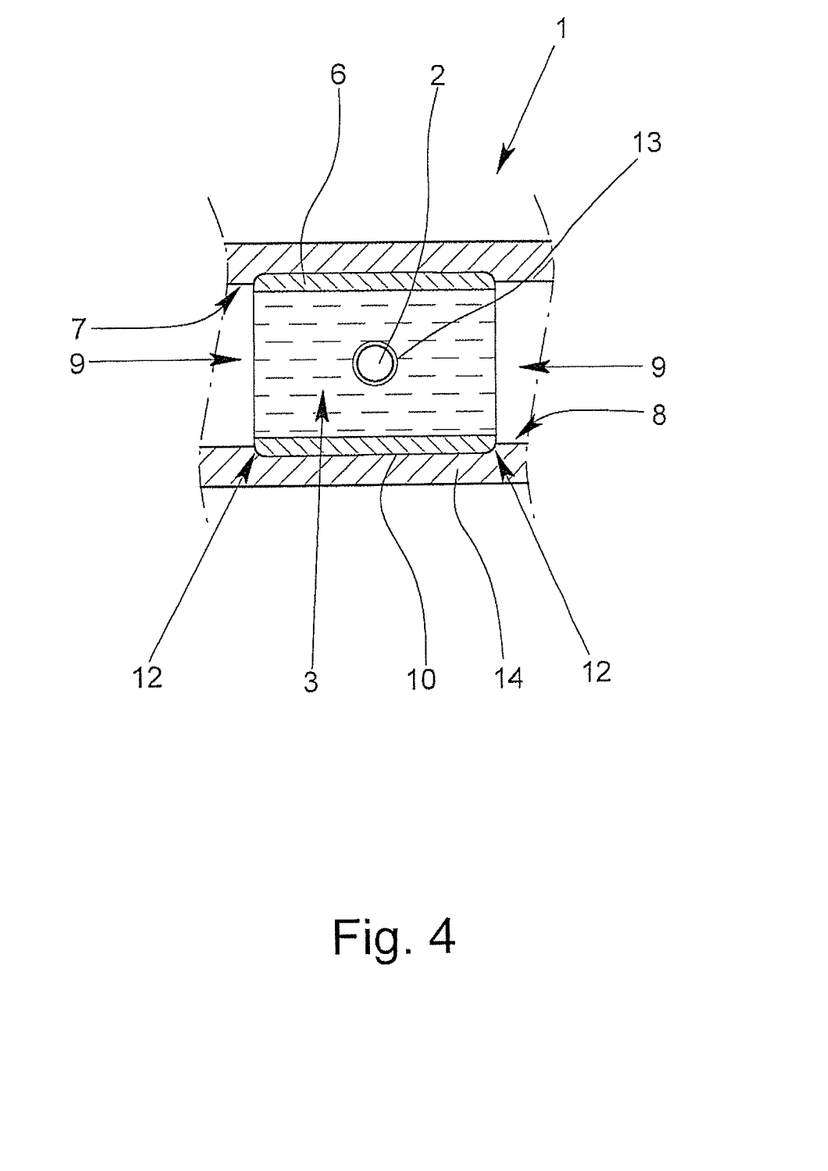
FIG. 4 shows a section of an embodiment of a measuring tube for an electromagnetic flowmeter with a protruding internal coating according to the invention.

FIG. 4 shows a section of a measuring tube 1 for an electromagnetic flowmeter, in which the internal coating 6 is applied in the area of the recess 10 and the layer thickness of the internal coating 6 is greater than the depth of the recess 10. The internal coating 6 thus creates a resulting measuring tube cross section 3, which is slightly smaller than the terminal cross section 9. The transitional area 12 has a curve-shaped contour in this embodiment. The electrode 2 is led through the measuring tube wall 14 with a feed-through 13. The feed-through 13 is not coated in the area of the flow channel.

FIGS. 5a) to j) show a plurality of different transitional areas 12 between the terminal cross section 9 and the recess 10. A short section of the measuring tube wall 14 is shown, which corresponds to the area that is marked with the dashed circle in FIG. 2. The layer thickness of the internal coating 6 is basically constant over the longitudinal direction of the recess 10 parallel to the direction of flow of the measurement fluid, wherein the transitional areas 12 represent an exception depending on the design. In FIGS. 5a), b), c) and j), the transitional areas 12 between the terminal cross section 9 and the recess 10 are designed in a step-like manner. Whereas, FIGS. 5d), e), h) and i) show a continuous transition between the terminal cross section 9 and the recess 10 by means of a slanted surface, and FIGS. 5f) and g) show a continuous transition between the terminal cross section 9 and the recess 10 with a curve-like contour. In FIGS. 5a), b), d), f) and i), the layer thickness of the internal coating 6 is greater than the depth of the recess 10, so that the internal coating 6 extends beyond the depth of the recess 10 and the resulting measuring tube cross section 3 in the area of the internal coating 6 is somewhat less than the terminal cross section 9.

In FIGS. 5c), e), g) and h), the layer thickness of the internal coating 6 corresponds to the depth of the recess 10 such that an even transitional area 12 between the terminal cross section 9 and the resulting measuring tube cross section 3 in the area of the internal coating 6 occurs. FIG. 5j) shows an alternative embodiment, in which the layer thickness of the internal coating 6 is less than the depth of the recess 10 such that the resulting measuring tube cross section 3 in the area of the internal coating 6 is greater than the terminal cross section 9. The transitional areas 12 shown in FIGS. 5h) and i) have a high production effort, but are characterized in having a very robust attachment of the internal coating 6 to the measuring tube 1. Of course, further combinations of transitional areas 12 and internal coatings 6 with different layer thickness are possible, but are not shown. For example, an internal coating 6 with a lower depth than the recess 10 with a transitional area 12 having a curve-shaped contour.

Figure 6:
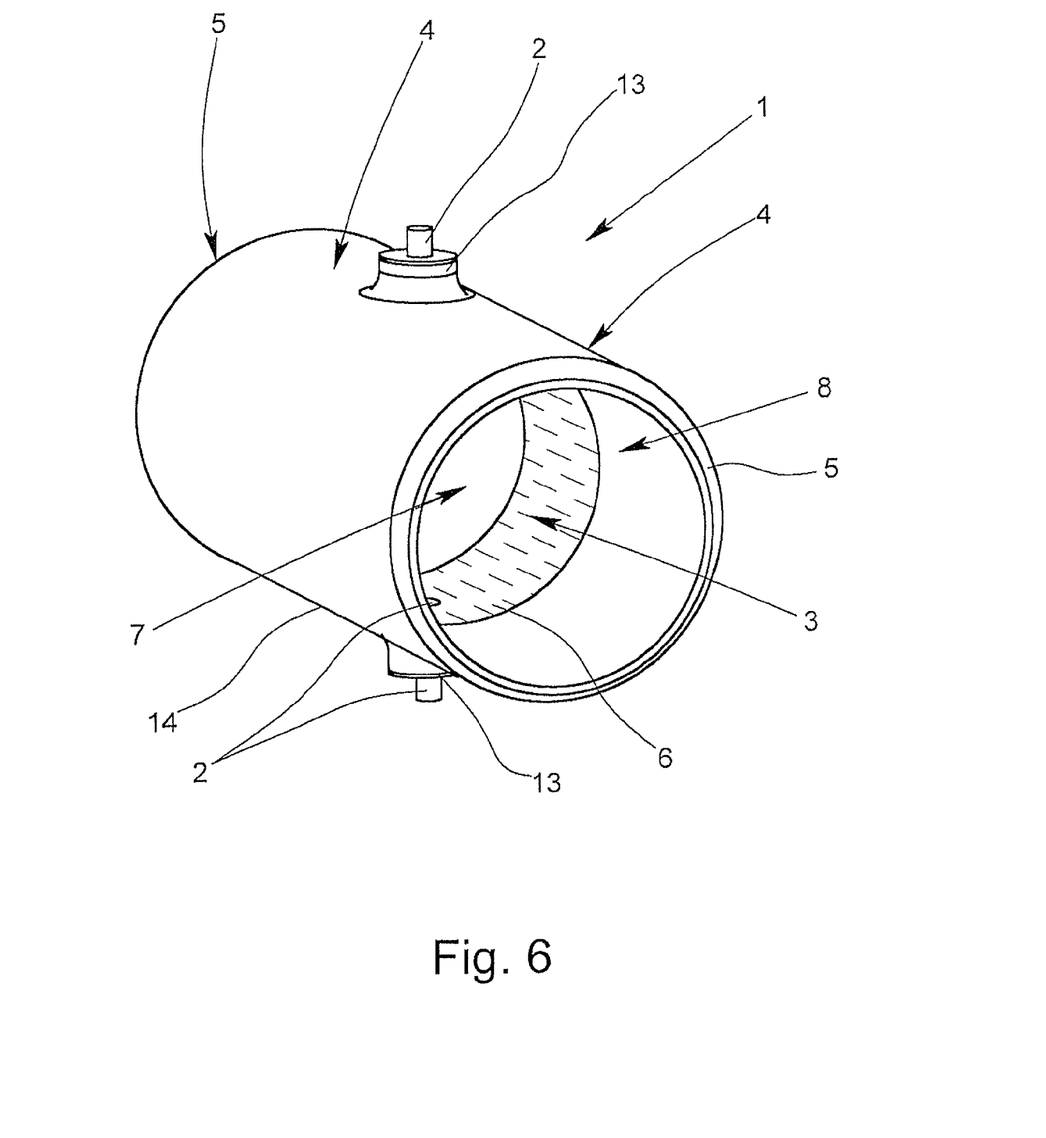
FIG. 6 shows an embodiment of a measuring tube for an electromagnetic flowmeter with a circular measuring tube cross section according to the invention.

FIG. 6 shows an alternative embodiment of the measuring tube 1 for an electromagnetic flowmeter, which has a uniform cross section over the entire length. The uniform measuring tube cross section 3 is implemented in that the internal coating 6 is applied in the area of the recess 10 in such a manner that the resulting measuring tube cross section 3 in the area of the internal coating 6 corresponds to the terminal cross section 9 of the inlet section 7 and the outlet section 8 such that a ledge is not created. Consequently, the measuring tube cross section 3 is uniform over the entire length of the terminal cross section, and in the embodiment shown in FIG. 9, the measuring tube cross section 3 corresponds to the cross section of the pipes of the piping system into which the electromagnetic flowmeter is to built. Thus, no influence of the flow within the piping system occurs from the presence of the measuring instrument. The measuring tube 1 has bevels 5 on its ends that act as joint preparation for welding the flowmeter in the piping system.

In the embodiment of FIG. 6, the internal coating 6 has a layer thickness of 450 µm, for example. The electrodes 2 are arranged perpendicular in the measuring tube wall 14 in the area of the internal coating 6. The feed-throughs 13 in the area of the flow channel correspond to the embodiment in FIG. 2 and are not coated. In the mounted state (not shown) the measuring tube 1 is built into a housing. Thus, the housing includes the measuring tube and, additionally, at least one evaluation electronic and at least one magnetic device for creating a magnetic field. The embodiment of FIG. 6 has a circular cross section such that the inner diameter over the entire length of the measuring tube 1 is constant. By way of non-limiting example, the internal coating 6 comprises ceramic.

What is claimed is:
1. An electromagnetic flowmeter comprising: a measuring tube having a measuring tube cross section, the measuring tube comprising:
   an inlet section,
   an outlet section,
   a recess formed in an inner wall surface between the inlet section and the outlet section, and
   an electrically-insulating internal coating positioned in the recess;
   at least two electrodes arranged in the recess of the measuring tube; and at least one magnetic device.

2. The electromagnetic flowmeter according to claim 1, wherein the recess has a depth that is partially filled with the internal coating.

3. The electromagnetic flowmeter according to claim 1, wherein the recess has a depth that is completely filled with the internal coating.

4. The electromagnetic flowmeter according to claim 3, wherein a layer thickness of the internal coating is greater than the depth of the recess.

5. The electromagnetic flowmeter according to claim 1, wherein the internal coating extends over at least one edge of the recess onto at least one of: the inlet section and the outlet section.

6. The electromagnetic flowmeter according to claim 1, wherein a layer thickness of the internal coating corresponds to a depth of the recess such that the measuring tube cross section is uniform.

7. The electromagnetic flowmeter according to claim 1, wherein at least one transitional area is provided between at least one of: the recess and the inlet section, and the recess and the outlet section.

8. The electromagnetic flowmeter according to claim 7, wherein the at least one transitional area has a slanted surface contour with a straight or curved profile.

9. The electromagnetic flowmeter according to claim 7, wherein the at least one transitional area has a step-shaped contour.

10. The electromagnetic flowmeter according to claim 1, wherein the recess has a depth of about 0.1 µm to 1000 µm.

11. The electromagnetic flowmeter according to claim 10, wherein the depth is about 100 µm to 300 µm.

12. The electromagnetic flowmeter according to claim 1, wherein the layer thickness is about 0.1 µm to 1000 µm.

13. The electromagnetic flowmeter according to claim 12, wherein the layer thickness is about 100 µm to 300 µm.

14. The electromagnetic flowmeter according to claim 1, wherein the electrically-insulating internal coating comprises a ceramic.

15. The electromagnetic flowmeter according to claim 14, wherein the ceramic is titanium oxide or aluminum silicates.

16. The electromagnetic flowmeter according to claim 1, wherein an inner contour of the measuring tube is a polygon.

17. The electromagnetic flowmeter according to claim 1, wherein an inner contour of the measuring tube is a rectangle having rounded corners.

18. The electromagnetic flowmeter according to claim 1, wherein the measuring tube is constructed as a reference electrode in at least one of: the inlet section and the outlet section.

19. The electromagnetic flowmeter according to claim 1, wherein the measuring tube further comprises at least two feed-throughs in a wall of the measuring tube, and the at least two electrodes are arranged in the corresponding at least two feed-throughs.

20. The electromagnetic flowmeter according to claim 19, wherein the at least two feed-throughs comprise glass or ceramic.

* * * * *